(12) United States Patent
Kato

(10) Patent No.: US 8,154,659 B2
(45) Date of Patent: Apr. 10, 2012

(54) MOBILE COMMUNICATION TERMINAL

(75) Inventor: Akira Kato, Osaka-fu (JP)

(73) Assignee: Murata Manufacturing Co., Ltd. (JP)

( * ) Notice: Subject to any disclaimer, the term of this patent is extended or adjusted under 35 U.S.C. 154(b) by 401 days.

(21) Appl. No.: 12/578,479

(22) Filed: Oct. 13, 2009

(65) Prior Publication Data

US 2010/0029329 A1 Feb. 4, 2010

Related U.S. Application Data

(63) Continuation of application No. PCT/JP2008/054377, filed on Mar. 11, 2008.

(30) Foreign Application Priority Data

Apr. 20, 2007 (JP) .................................. 2007-111217

(51) Int. Cl.
*H04N 7/00* (2011.01)
(52) U.S. Cl. ..................................... 348/552; 455/552.1
(58) Field of Classification Search .................. 348/552, 348/158, 441, 460, 469, 507, 508, 553, 734, 348/554, 563, 564, 725; 725/99, 141, 153, 725/80, 37, 81, 133, 74, 84, 38; 455/63.1, 455/556.1, 323, 550.1, 552.1, 454, 553, 456.1, 455/455, 3.06, 404.2
See application file for complete search history.

(56) References Cited

U.S. PATENT DOCUMENTS

| | | | |
|---|---|---|---|
| 2007/0177656 A1* | 8/2007 | Maruta et al. ................. | 375/148 |
| 2007/0222519 A1* | 9/2007 | Deng et al. .................... | 330/285 |

FOREIGN PATENT DOCUMENTS

| | | |
|---|---|---|
| JP | 63-69398 | 3/1988 |
| JP | 07-59072 | 3/1995 |
| JP | 2003-218811 | 7/2003 |
| WO | 2008/132885 | 3/2008 |

OTHER PUBLICATIONS

International Search Report; PCT/JP2008/054377; Apr. 22, 2008.
Minoru Yamanaka; Written Opinion of the International Searching Authority; PCT/JP2008/054377; Apr. 22, 2008.

* cited by examiner

*Primary Examiner* — Lana N Le
*Assistant Examiner* — Golam Sorowar
(74) *Attorney, Agent, or Firm* — Studebaker & Brackett PC; Tim L. Brackett, Jr.; John F. Guay

(57) ABSTRACT

To perform operation check self-diagnosis of a digital terrestrial television broadcasting reception function of a multifunctional mobile communication terminal in any place without requiring addition of a special additional circuit component, or the like. When performing operation check self-diagnosis of a DTV reception unit 4, a first transmission signal of a GSM transmission/reception circuit 2 and a second transmission signal of a WLAN communication unit 3 are mixed using the non-linear characteristic of the LNA 41 of the DTV reception unit 4 while using transmission outputs of the GSM transmission/reception circuit 2 and WLAN communication unit 3. Due to the mixture, a difference signal having a frequency that is the difference between both the transmission signals in the reception frequency band of the DTV reception unit 4 is generated. On the basis of the difference signal, operation check self-diagnosis of the DTV reception unit 4 is performed.

20 Claims, 7 Drawing Sheets

DTV RECEIVER

MOBILE COMMUNICATION TERMINAL

CROSS REFERENCE TO RELATED APPLICATIONS

The present application is a continuation of International Application No. PCT/JP2008/054377, filed Mar. 11, 2008, which claims priority to Japanese Patent Application No. JP2007-111217 filed Apr. 20, 2007, the entire contents of each of these applications being incorporated herein by reference in their entirety.

BACKGROUND OF THE INVENTION

1. Field of the Invention

The present invention relates to a mobile communication terminal having not only mobile phone functions but also at least a function of receiving digital terrestrial television broadcasting targeted to mobile communication terminals and a function of communicating with a network, such as a multifunctional (versatile) mobile phone. More specifically, the invention relates to operation check self-diagnosis of a digital terrestrial television broadcasting receiver of the mobile communication terminal. In the present invention, the "mobile phone functions" refer to wireless call and communication functions using a telephone network of various mobile communication terminals including mobile phones, personal handy-phone system (PHS) phones, and the like.

2. Description of the Related Art

In recent years, it has been proposed to incorporate into mobile communication terminals typified by mobile phones not only mobile phone functions but also at least a function of communicating with a network, such as a local area network (LAN) or a personal area network (PAN), and a function of receiving digital terrestrial television broadcasting targeted to mobile communication terminals in order to promote increases in user convenience, and the like.

Such a multifunctional and versatile mobile communication terminal is manufactured by modularizing the functions on a function-by-function basis and incorporating the module components having the functions into a case.

As for the above-mentioned digital terrestrial television broadcasting reception function, the module components must undergo operation check individually in the component manufacturing process, as a matter of course. Further, the module components must undergo operation check with the module components mounted or incorporated in a mobile communication terminal in the process of assembling mobile communication terminals, the process of shipping them, and the like.

Also, after shipped mobile communication terminals are provided to users, a situation where a radio wave is not received occurs in areas where it is difficult to receive broadcasting, reinforced concrete buildings, and places where radio waves of digital terrestrial television broadcasting are extremely weak or such radio waves do not reach the mobile communication terminals, such as a underground shopping center even if the users attempt to receive digital terrestrial television broadcasting. Poor reception generally creates dissatisfaction as well as anxiety to the users. Therefore, it is convenient to provide, when such a situation occurs, an operation check self-diagnosis that can be performed easily to determine whether the digital terrestrial television broadcasting reception function is operating normally.

For example, with regard to a wireless communication unit for ship, it has been proposed to perform operation check self-diagnosis of a transmission/reception section of the unit using a folding circuit, such as generally discussed in, for example, Japanese Unexamined Patent Application Publication No. 2003-218811 (Abstract, paragraphs [0022] to [0048], FIG. 1, etc.).

FIG. 7 shows a wireless communication unit 100 for ship disclosed in the above-mentioned Japanese Unexamined Patent Application Publication No. 2003-218811. The wireless communication unit 100 transmits or receives radio waves to or from other ships or seacoast stations via a satellite (not shown) and has a self-diagnosis function. For this reason, the wireless communication unit 100 includes a control circuit 101 that controls the entire wireless communication unit 100, a frequency converter 102, an RF section 103, and a local signal supply circuit 104 that functions as a part of the folding circuit.

The control circuit 101 includes a control section 105, a demodulator 106, and a modulator 107. The control section 105 performs activation or deactivation of a local signal oscillator 108 of the local signal supply circuit 104, control of gains of an automatic gain control amplifier (AGC) 109 and a power amplifier 110 of the RF section 103, and the like. Also, the control section 105 provides transmission data of a baseband signal to the modulator 107 and takes in demodulation data of a baseband signal demodulated and outputted by the demodulator 106.

In the RF section 103, a diplexer 112 connected to an antenna 111 includes a reception band-pass filter 112A having a pass frequency of 1.5 GHz and a transmission band-pass filter 112B having a pass frequency of 1.6 GHz.

An output signal of the reception band-pass filter 112A is inputted into the frequency converter 102 via an RF reception-type low-noise amplifier (LNA) 113, a band-pass filter 114 having a pass frequency of 1.5 GHz, and an automatic gain control amplifier 109. A transmission signal of the frequency converter 102 is inputted into the transmission band-pass filter 112B via the power amplifier 110.

The local signal supply circuit 104 is provided to perform self-diagnosis and is activated only when performing self-diagnosis. When performing self-diagnosis, the local signal oscillator 108 generates a local signal L of 0.1 GHz, and the generated local signal L is inputted into the input of the low-noise amplifier 113 via the filter circuit 115.

In the filter circuit 115, 116 is a stopping capacitor, and 117 and 118 represent choking coils for interrupting the local signal L.

When performing normal operation in which radio signals are transmitted or received, the local signal oscillator 108 is deactivated.

During such a period, a baseband signal of transmission data outputted from the control section 105 of the control circuit 101 is converted into an intermediate-frequency signal in the modulator 107. Subsequently, the intermediate-frequency signal is further converted into a signal of 1.6 GHz by the frequency converter 102. The signal of 1.6 GHz is power-amplified by the power amplifier 110 and then wirelessly transmitted from the antenna 111 via the diplexer 112 as a transmission signal Sd.

Also, a reception signal of 1.5 GHz of the antenna 111 is inputted into the low-noise amplifier 113 via the diplexer 112 and then inputted into the automatic gain control amplifier 109 via the low-noise amplifier 113 and band-pass filter 114. Then, the signal is amplified to given amplitude by the automatic gain control amplifier 109 and then provided to the frequency converter 102. The frequency converter 102 converts the above-mentioned reception signal of 1.5 GHz into an intermediate-frequency signal and provides the intermediate-frequency signal to the demodulator 106. The demodulator 106 demodulates the intermediate-frequency signal into a baseband signal, and demodulation data of the baseband signal is decoded in the control section 105.

On the other hand, when performing self-diagnosis, the control section 105 of the control circuit 101 activates the local signal oscillator 108, which brings the local signal oscillator 108 into an oscillation state—a state where a reception signal of the antenna 111 is not inputted.

Also, the control section 105 outputs a baseband signal of transmission data for self-diagnosis to the modulator 107.

Subsequently, the above-mentioned baseband signal of transmission data for self-diagnosis is modulated into an intermediate-frequency signal by the modulator 107. The intermediate-frequency signal is converted into a signal having given amplitude and 1.6 GHz by the frequency converter 102. The signal is passed through the power amplifier 110 and band-pass filter 112B and then leaked into the low-noise amplifier 113 via the band-pass filter 112A as a leak signal Se of 1.6 GHz.

At that time, the local signal L of 0.1 GHz of the local signal oscillator 108 is provided to the input of the low-noise amplifier 113 via the choking coil 118.

Subsequently, the leak signal Se of 1.6 GHz and the local signal L of 0.1 GHz are mixed using the input-output non-linear characteristic of the low-noise amplifier 113. Thus, a signal of 1.7 GHz and a signal Sm of 1.5 GHz, which is a frequency identical to that of the reception signal occur at the output of the low-noise amplifier 113.

Also, the signal of 1.7 GHz is blocked by the band-pass filter 114. Thus, the signal Sm that is 1.5 GHz identical to the frequency of the reception signal and can be used as a self-diagnosis signal is provided to the frequency converter 102 via the automatic gain control amplifier 109. Then, an intermediate-frequency signal of the signal Sm outputted from the frequency converter 102 is provided to the control circuit 101.

Subsequently, the control section 105 of the control circuit 101 compares demodulation data obtained by demodulating the above-mentioned intermediate-frequency signal (folded signal) of the signal Sm using the demodulator 106, with the transmitted original transmission data for self-diagnosis. Thus, the control section 105 determines whether the RF section 103 and the like are normal or abnormal. Thus, the control section 105 performs operation check self-diagnosis.

This type of mobile communication terminals, such as the above-mentioned multifunctional mobile phone, must undergo operation check of the digital terrestrial television broadcasting reception function included therein in the assembly process, shipping process, or the like.

In this case, in order to avoid an increase in cost of a mobile communication terminal due to an operation test as much as possible, it is desirable that the mobile communication terminal perform operation check self-diagnosis of the function of receiving digital terrestrial television broadcasting targeted to mobile communication terminals without using a test instrument dedicated to digital terrestrial television broadcasting, such as an OFDM test instrument.

Also, if a mobile communication terminal includes such a self-diagnosis function, it is possible to easily perform the above-mentioned operation check as to whether the digital terrestrial television broadcasting reception function is normally operating (i.e., whether there is or not a failure in a module component) in places where a radio wave of digital terrestrial television broadcasting is extremely weak or does not reach the mobile communication terminal, or the like, as described above, after the mobile communication terminal is provided to a user. A self-diagnosis function is convenient and provides an increase in, e.g., reliability of the communication device.

However, there has not been invented any configuration where this type of multifunctional mobile communication terminal performs self-diagnosis of an operation test of the included function of receiving digital terrestrial television broadcasting targeted to mobile communication terminals.

On the other hand, it can be said that the above-mentioned wireless communication unit 100 for ship shown in FIG. 7 has a configuration where an oscillator OSC necessary for self-diagnosis is added to a transmission block Ta and a reception block Ra originally necessary for communication, as shown in FIG. 8. The transmission block Ta is a circuit block extending from the modulator 107 to the band-pass filter 112B via the frequency converter 102 and power amplifier 110 in FIG. 7. The reception block Ra is a circuit block extending from the band-pass filter 112A to the frequency converter 102 via the low-noise amplifier 113, band-pass filter 114, and automatic gain control amplifier 109 in FIG. 7. The oscillator OSC is the local signal supply circuit 104 shown in FIG. 7.

The wireless communication unit 100 can self-diagnose whether the included function is running. However, the wireless communication unit 100 requires the oscillator OSC for self-diagnosis that is not necessary for call and communication, which are the original functions. For this reason, a special additional circuit component, such as the local signal oscillator 108, must be included in the wireless communication unit 100.

Also, in order for the oscillator OSC to accurately generate the local signal L of 0.1 GHz significantly distant from the original transmission frequency of 1.5 GHz of the wireless communication unit 100, the oscillator OSC must be actually formed on a PLL circuit that includes a voltage control-type oscillator using a quartz crystal vibrator, a frequency divider, a phase comparator, and the like, is large in circuit size and costly, occupies a large area of a substrate, and has a low frequency.

Therefore, the wireless communication unit 100 including the oscillator and having the self-diagnosis function is made up of many components and is complicated, costly, and large in size.

It is also conceivable to use an external adaptor for the wireless communication unit 100 as the oscillator OSC. In this case, the wireless communication unit 100 becomes low-cost and small accordingly. However, the oscillator block OSC adaptor must be always prepared and a power supply for this adaptor is required independently. For this reason, the whole unit including the oscillator OSC adaptor becomes large in size and costly unexpectedly. Further, self-diagnosis can be performed only in places where power supply for the adaptor can be obtained, or the like. That is, in not all places can self-diagnosis be performed.

Also, the wireless communication unit 100 performs self-diagnosis by generating the signal Sm having a frequency that is the difference between the leak signal Se and local signal L, i.e., the signal Sm of 1.5 GHz identical to the frequency of the reception signal due to internal modulation distortion between the leak signal Se of 1.6 GHz of transmission data for self-diagnosis and the local signal L of 0.1 GHz using the non-linear characteristic of the low-noise amplifier 113. In this case, the original leak signal Se strongly remains at 1.6 GHz near the signal Sm of 1.5 GHz. As such, the leak signal Se may interfere with reception.

It is also conceivable to incorporate an additional circuit, such as an oscillator similar to the local signal oscillator 108, into this type of multifunctional mobile communication terminal so that the mobile communication terminal performs operation check self-diagnosis of the included digital terrestrial television broadcasting reception function as in the wireless communication unit 100. However, dosing so requires a special additional circuit component for self-diagnosis, resulting in upsizing of the mobile communication terminal, i.e., failing to meet a downsizing demand. Further, the cost is significantly increased.

Also, it is conceivable to form a special additional circuit component for self-diagnosis in an adaptor independent of the mobile communication terminal. In this case, the whole unit including the adaptor becomes complicated, costly, and larger in size unexpectedly. Further, it is inconvenient to carry the adaptor together with the mobile communication terminal. Furthermore, self-diagnosis can be performed only in places where power supply for the adaptor can be obtained. Hence, there is a problem with regard to restricted places where self-diagnosis cannot be performed.

Also, there is a problem that in any of the case where the above-mentioned special additional circuit component for self-diagnosis is incorporated into the mobile communication terminal and the case where such an additional circuit component is formed as an adaptor, the above-mentioned reception interference occurs.

SUMMARY OF THE INVENTION

Accordingly, it is an object of the present invention to allow a mobile communication terminal to favorably perform operation check self-diagnosis of an included function of receiving digital terrestrial television broadcasting targeted to mobile communication terminals in any place without requiring addition of a special additional circuit component, or the like.

In order to achieve the above-mentioned object, a mobile communication terminal according to the present invention includes: a transmission/reception circuit having a mobile phone function; a communication unit having a function of communicating with a network formed by at least one local area network communication unit and/or at least one personal area network communication unit, the at least one local area network communication unit and/or the at least one personal area network communication unit using a frequency band in an industry-science-medical (ISM) band; and a digital terrestrial television broadcasting receiver that receives digital terrestrial television broadcasting targeted to mobile communication terminals. The digital terrestrial television broadcasting receiver includes: a low-noise amplifier that amplifies a received and inputted RF signal; a local oscillator that generates a signal having a frequency corresponding to an output signal of the low-noise amplifier; a mixer that mixes the output signal of the low-noise amplifier with the output signal of the local oscillator; an A/D converter that analog-digital-converts a baseband signal contained in the RF signal into a digital signal, the baseband signal being obtained due to the mixture; and a demodulation circuit that demodulates the digital signal obtained by the A/D converter. The mobile communication terminal has a self-diagnosis function of: receiving a first transmission signal outputted by the transmission/reception circuit having a mobile phone function and a second transmission signal outputted by the communication unit having a function of communicating with a network using the digital terrestrial television broadcasting receiver; generating a difference signal having a frequency that is a difference between both the transmission signals by mixing both the transmission signals using a non-linear characteristic of the low-noise amplifier; and self-diagnosing whether the digital terrestrial television broadcasting receiver is normally operating, on the basis of an output of the A/D converter based on an output signal of the mixer obtained by mixing the difference signal with the output signal of the local oscillator.

In another embodiment, the digital terrestrial television broadcasting receiver of the mobile communication terminal according to the present invention is preferably configured to receive a radio wave obtained by combining the first transmission signal and the second transmission signal in space, using an antenna for receiving digital terrestrial television broadcasting and to input the radio wave into the low-noise amplifier.

In another embodiment, the mobile communication terminal according to the present invention preferably has a configuration where the digital terrestrial television broadcasting receiver and the transmission/reception circuit having a mobile phone function are connected to each other via a normally open switch by wire, and the digital terrestrial television broadcasting receiver and the communication unit having a function of communicating with a network are connected to each other via a normally open switch by wire, and only when performing self-diagnosis, both the switches are closed so that the first transmission signal and the second transmission signal are inputted into the low-noise amplifier.

In another embodiment, the self-diagnosis function of the mobile communication terminal according to the present invention is preferably configured to self-diagnose whether the digital terrestrial television broadcasting receiver is normally operating, on the basis of an output of the demodulation circuit instead of the output of the A/D converter.

In another embodiment, the LAN communication unit of the mobile communication terminal according to the present invention is a wireless LAN (hereafter referred to as "WLAN") communication unit.

In another embodiment, the PAN communication unit of the mobile communication terminal according to the present invention is a Bluetooth communication unit.

In another embodiment, the low-noise amplifier of the mobile communication terminal according to the present invention is formed using a differential amplifier having first and second input terminals and has a configuration where an input signal inputted from the first input terminal is applied to a base or gate of a first transistor and an input signal inputted from the second input terminal is applied to a base or gate of a second transistor. The low-noise amplifier is characterized in that by making a bias voltage applied to the base or gate of the first transistor and a bias voltage applied to the base or gate of the second transistor different from each other, non-linear operation of the low-noise amplifier is facilitated so that the first transmission signal and the second transmission signal are easily mixed.

In another embodiment, the mobile communication terminal according to the present invention is characterized in that a waveform distortion circuit that is activated only at the time of self-diagnosis so as to distort waveforms of the first and second transmission signals is additionally provided in the preceding stage of the low-noise amplifier so that the first and second transmission signals are easily mixed.

According to an embodiment of the present invention, when performing operation check self-diagnosis of the digital terrestrial television broadcasting receiver included in the mobile communication terminal, the first transmission signal transmitted and outputted from the transmission/reception circuit having a mobile phone function and the second transmission signal transmitted and outputted from the communication unit having a function of communicating with a network are mixed using the non-linear characteristic of the low-noise amplifier of the digital terrestrial television broadcasting receiver while using transmission outputs of the transmission/reception circuit having a mobile phone function and the communication unit having a function of communicating with a network. Thus, a difference signal having a frequency that is the difference between both the transmission signals can be easily generated as an RF signal having the reception frequency of the digital terrestrial television broadcasting receiver.

Subsequently, the difference signal and an output signal of the local oscillator of the digital terrestrial television broadcasting receiver are mixed in the mixer of the receiver. A signal similar to a baseband signal obtained by demodulating the RF signal due to the mixture is demodulated from the difference signal. The signal obtained from the demodulation is converted into a digital signal by the A/D converter and then subjected to decoding processing in the demodulation circuit.

At this time, self-diagnosis can be performed by verifying whether a circuit section extending to the A/D converter, of the digital terrestrial television broadcasting receiver is normal.

According to the present invention, whether the digital terrestrial television broadcasting receiver is normally operating can be self-diagnosed on the basis of the output of the A/D converter.

Also, since an RF signal necessary for self-diagnosis is generated using transmission outputs of the transmission/reception circuit having a mobile phone function and the communication unit having a function of communication with a network included in the mobile communication terminal as well as using the non-linear characteristic of the low-noise amplifier of the digital terrestrial television broadcasting receiver, it is possible to perform operation check self-diagnosis as to whether a module having the included digital terrestrial television broadcasting reception function is normally operating, in any place without requiring a special additional circuit component.

Also, any of the first and second transmission signals are not signals having a frequency close to the frequency of a reception signal of the digital terrestrial television broadcasting receiver, so leak signals thereof are unlikely to interfere with reception.

According to an above-described embodiment of the present invention, a radio wave of the first transmission signal transmitted and outputted from the transmission/reception circuit having a mobile phone function and a radio wave of the second transmission signal transmitted and outputted from the communication unit having a function of communicating with a network are combined in space and then received by an antenna for receiving digital terrestrial television broadcasting. Then, the reception signal is inputted into the low-noise amplifier of the digital terrestrial television broadcasting receiver and a signal having a frequency that is the difference between the both the transmission signals is generated. Thus, an advantage similar to that of the above-mentioned embodiment is obtained. In this case, both the transmission signals are wirelessly transmitted to the digital terrestrial television broadcasting receiver, so there are advantages, such as one that there is no need to prepare a transmission path for both the transmission signals and thus the configuration is simplified.

According to an above-described embodiment of the present invention, only when self-diagnosing the digital terrestrial television broadcasting reception function, both the switches are closed, and the transmission/reception circuit having a mobile phone function and the communication unit having a function of communicating with a network are connected to the digital terrestrial television broadcasting receiver by wire so that a wired transmission path for both the transmission signals is formed. Subsequently, the difference signal is generated by inputting both the transmission signals that have passed through the wired transmission path, into the low-noise amplifier. Thus, an advantage similar to that of the above-discussed embodiment can be obtained. In this case, there is also an advantage that except when performing self-diagnosis, both the normally open switches are opened and thus the wired transmission path is cut off so that any of the transmission signals is not inputted into the low-noise amplifier of the digital terrestrial television broadcasting receiver and unnecessary signals are not received.

According to an above-described embodiment of the present invention, whether the digital terrestrial television broadcasting receiver is normally operating is self-diagnosed on the basis of, instead of the output of the A/D converter of the digital terrestrial television broadcasting receiver, an output of the demodulation circuit to which a digital signal of the output of the A/D converter has been inputted. Thus, diagnosis extending to the demodulation circuit can be performed.

According to an above-described embodiment of the present invention, by adopting a practical configuration using a WLAN communication unit having a function of communicating with a network, the advantages described above can be obtained.

According to an above-described embodiment of the present invention, by adopting a practical configuration using a Bluetooth communication unit having a function of communicating with a network, the advantages described above can be obtained can be obtained.

According to an above-described embodiment of the present invention, a specific configuration where the low-noise amplifier of the digital terrestrial television broadcasting receiver is formed using a differential amplifier can be provided.

Also, by making bias voltages applied to the base or gate of the first and second transistors of the differential amplifier different from each other so as to strengthen the non-linear characteristic thereof, the first transmission signal transmitted and outputted from the transmission/reception circuit having a mobile phone function and the second transmission signal transmitted and outputted from the communication unit having a function of communicating with a network are easily mixed and an RF signal having a frequency that is a difference between both the transmission signals is reliably generated. Thus, self-diagnosis can be performed.

According to an above-described embodiment of the present invention, the waveform distortion circuit is additionally provided in the preceding stage of the low-noise amplifier. Thus, when performing self-diagnosis, the first and second transmission signals received by the digital terrestrial television broadcasting receiver are more easily and reliably mixed and an RF signal having a frequency that is a difference between both the transmission signals is reliably generated even if the non-linear characteristic of the low-noise amplifier is not sufficient. Thus, self-diagnosis can be performed.

DESCRIPTION OF THE PREFERRED EMBODIMENTS

In order to describe the present invention in more detail, the above-summarized embodiments will be described in detail on the basis of FIGS. 1 to 6.

A first embodiment will be described with reference to FIGS. 1 to 3.

Figure 1:
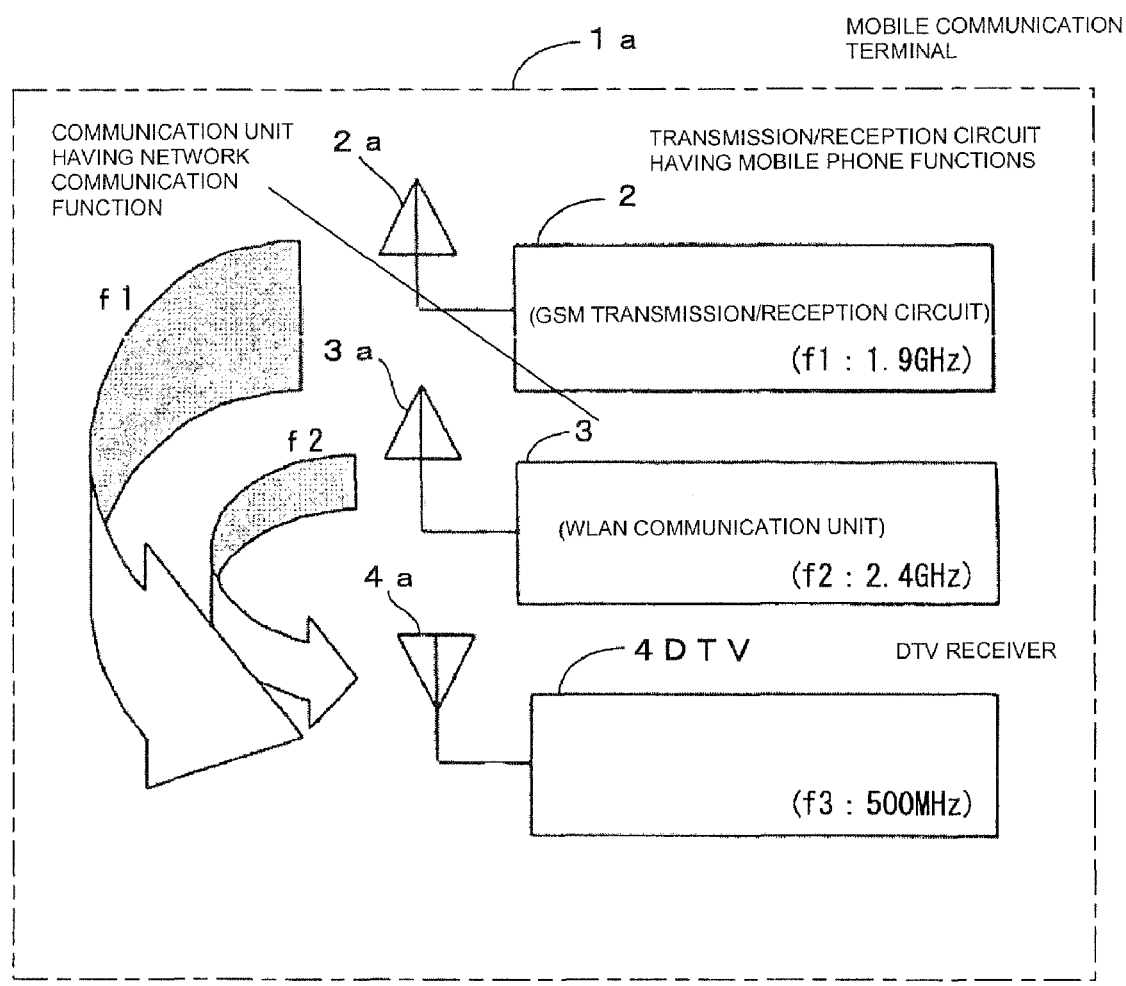
FIG. 1 is a block diagram showing a schematic configuration of a mobile communication terminal according to a first embodiment of the present invention.

FIG. 1 shows a schematic block configuration of a mobile communication terminal 1a according to this embodiment. The mobile communication terminal 1a has a configuration of a multifunctional mobile phone including at least a transmission/reception circuit 2 having mobile phone functions, a network communication unit 3 formed by at least one LAN communication unit and/or at least one PAN communication unit using a frequency band in the industry-science-medical (ISM) band, and a digital terrestrial television broadcasting reception unit 4 that receives digital terrestrial television broadcasting targeted to mobile communication terminals.

In this embodiment, the transmission/reception circuit 2 having mobile phone functions is a transmission/reception circuit conforming to global system for mobile communications (GSM), which is a global standard for second-generation mobile phones and will be hereafter referred to as a "GSM transmission/reception circuit 2." The transmission/reception frequency of the GSM transmission/reception circuit 2 is, for example, a frequency in a 1.9 GHz band (specifically, 1850 to 1910 MHz) conforming to the PCS1900 standard, which is being widely used in north America and is, more specifically, 1.9 GHz (specifically, 1910 MHz), which is the frequency H of an unmodulated carrier wave thereof.

In this embodiment, the network communication unit 3 is a unit formed using a WLAN communication unit that performs wireless communications in a 2.46 GHz band in the ISM and will be hereafter referred to as a WLAN communication unit 3. The WLAN communication unit 3 performs communications using an OFDM modulation wave having the frequency f2 of 2.4 GHz (specifically, 2402 MHz). The above-mentioned OFDM modulation wave covers a band of about 500 kHz corresponding to one segment of so-called "one-seg," which is targeted to mobile terminals conforming to the standard ISDB-T, which is a standard for Japan's digital terrestrial television broadcasting. The OFDM modulation wave also covers a 1.5 MHz band conforming to the standard T-DMB (equivalent to European standard DAB) for digital terrestrial television broadcasting targeted to Korean mobile terminals.

The digital terrestrial television broadcasting receiver 4 is a unit that receives digital terrestrial television broadcasting that is broadcast in the UHF band and targeted to mobile terminals, such as the above-mentioned "one-seg" and will be hereafter referred to as a "DTV receiver 4." Also, digital terrestrial television broadcasting will be hereafter referred to as "DTV."

When performing self-diagnosis of the DTV receiver 4, a radio wave of a transmission signal (first transmission signal) of an antenna 2a of the GSM transmission/reception circuit 2 embedded in the mobile communication terminal 1a and a radio wave of a transmission signal (second transmission signal) of an antenna 3a of the WLAN communication unit 3 are received by an antenna 4a for receiving digital terrestrial television broadcasting, of the DTV receiver 4. At that time, as shown by arrows W1 and W2 in the drawing, the radio wave of the transmission signal having the frequency f1 and the radio wave of the transmission signal having the frequency f2 are combined in space and then received by the antenna 4a.

Then, in the DTV receiver 4, the received and inputted transmission signals are mixed using the non-linear characteristic of a low noise amplifier to be described later so that second-order inter-modulation distortion (IMD) occurs. Thus, a UHF-band difference signal having a frequency f3 (i.e., f3=|f1−f2|), that is, 500 MHz (specifically, 592 MHz) indicating the difference between the transmission signals received by the antenna 4a is generated and diagnosis is performed using this difference signal.

Figure 2:
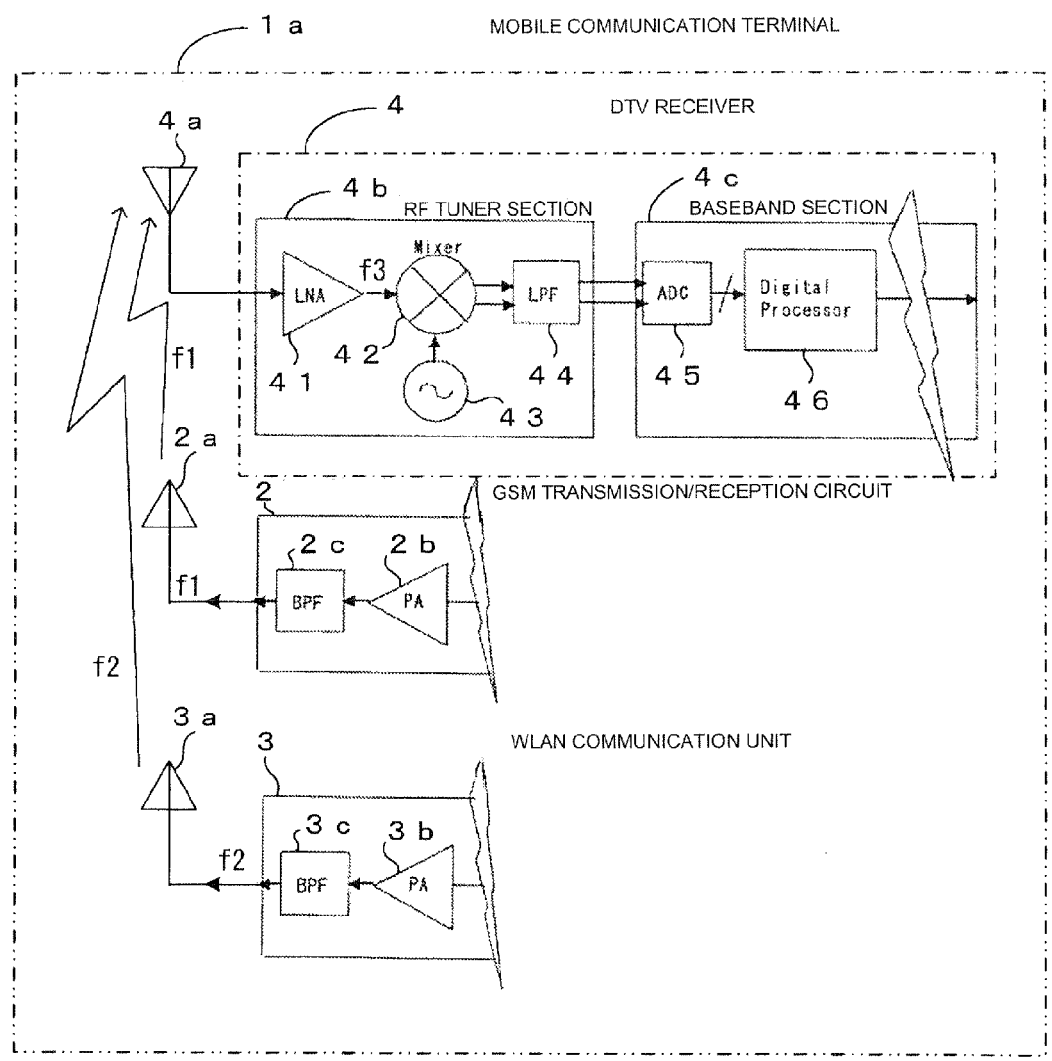
FIG. 2 is a detailed block connection diagram of the mobile communication terminal shown in FIG. 1.

For example, the GSM transmission/reception circuit 2, WLAN communication unit 3, and DTV receiver 4 shown in FIG. 1 are configured as shown in FIG. 2. FIG. 2 is a detailed block connection diagram of the mobile communication terminal 1a.

When performing self-diagnosis of the DTV receiver 4, the mobile communication terminal 1a is placed in DTV self-diagnosis mode, for example, by clicking on a diagnosis operation button (not shown) provided on the mobile communication terminal 1a.

By setting the DTV self-diagnosis mode, the GSM transmission/reception circuit 2 outputs the above-mentioned first transmission signal of the unmodulated carrier wave for diagnosis having the frequency f1 from a power amplifier (PA) 2b in the transmission output stage to the antenna 2a via a band-pass filter (BPF) 2c and then outputs the radio wave from the antenna 2a.

Simultaneously, the WLAN communication unit 3 outputs the above-mentioned second transmission signal of the OFDM modulation wave for diagnosis having the frequency f2 from a power amplifier (PA) 3b in the transmission output stage to the antenna 3a via a band-pass filter (BPF) 3c and outputs the radio wave from the antenna 3a.

Figure 3:
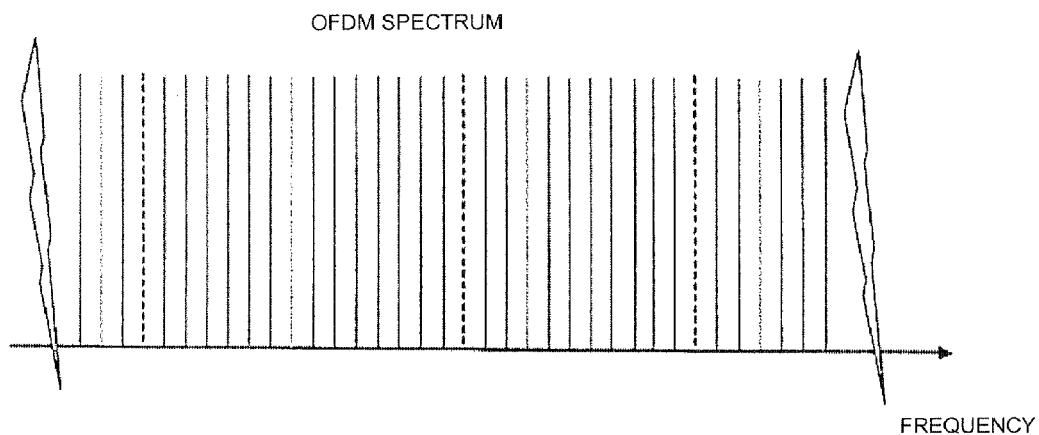
FIG. 3 is a drawing showing an example of a spectrum of an OFDM wave of a second transmission signal shown in FIG. 1.

At that time, the above-mentioned second transmission signal is preferably set to a spectrum signal modulated in the same way that the OFDM signal of DTV is modulated and as shown in FIG. 3. This is because by setting the second transmission signal to such a spectrum signal, it is possible to perform operation check with respect to OFDM demodulation, forward error correction (FEC) decoding, or transmission parameter signaling (TPS) demodulation, including transmission and multiplexing configuration control (TMCC) signal, when a base band section 4c, which is to be described later, of the DTV receiver 4 performs digital processing.

It should be noted that, beside normal OFDM carrier waves (e.g., as shown solid lines in FIG. 3), the above-mentioned spectrum includes unmodulated pilot carriers, such as shown as alternate long and short dashed lines in FIG. 3, and TPS (TMCC) carrier waves (e.g., shown as dashed lines in FIG. 3) obtained by BPSK-modulating a modulation signal parameter.

TPS (TMCC) refers to carrier waves obtained by BPSK-modulating only various transmission parameters in an OFDM signal of European/Japanese DTV. Several tens to several hundred TPS (TMCC) carrier waves are embedded in the OFDM signal. According to the European standard DVB-T/DVB-H, TPS is an abbreviation of transmit parameter signal.

At the same that the mobile communication terminal 1a is placed in DTV self-diagnosis mode, the DTV receiver 4 is also activated in self-diagnosis mode.

Since the DTV receiver 4 is formed in the smallest possible size, it reproduces a baseband signal by directly converting an RF signal received by an RF tuner section 4b that is the subsequent stage of the antenna 4a. Further, a subsequent baseband section 4c A/D-converts the above-mentioned baseband signal into a digital signal and subjects the digital signal to digital signal processing, such as OFDM demodulation.

According to the above-described arrangement, the RF tuner section 4b includes a high-frequency LNA 41, a mixer 42, a local oscillator 43, and a low-pass filter (hereafter referred to as "LPS") 44 for eliminating unnecessary components. The baseband section 4c includes an A/D converter (hereafter referred to as "ADC") 45 and a digital processing unit 46 that performs OFDM demodulation or the like. The LNA 41 constitutes a low-noise amplifier according to the present invention, and the digital processing unit 46 constitutes a demodulation circuit according to the present invention.

When performing self-diagnosis of the DTV receiver 4, the first and second transmission signals (RF signal), which have been combined in space and then received by the antenna 4a, are inputted into the LNA 41 and amplified therein. At this time, the signals are mixed using the non-linear characteristic of the LNA 41 so that second-order inter-modulation distortion occurs. Thus, a difference signal having the frequency f3 in the UHF band is generated and then outputted from the LNA 41. For example, if the GSM transmission/reception circuit 2 transmits and outputs the first transmission signal at +30 dBm, and if the WLAN communication unit 3 transmits and outputs the second transmission signal at +10 dBm, the above-mentioned difference signal appears at the output of the LNA 41 with magnitude of at least −50 dBm or so that allows operation check for self-diagnosis. In order for the LNA 41 to facilitate distortion when performing self-diagnosis, the sensitivity of the LNA 41 is preferably set to the most sensitive state.

Then, the above-mentioned difference signal outputted from the LNA 41 is inputted into the subsequent mixer 42.

At that time, in order to perform the above-mentioned direct conversion, the local oscillator 43 generates a local oscillation signal having the frequency of the difference signal outputted from the LNA 41 as a signal having a frequency corresponding to the output signal of the LNA 41. The local oscillator 43 is formed, for example, using a known PLL oscillator and is small in size due to its high oscillation frequency.

Then, the mixer 42 reproduces a baseband signal from the above-mentioned difference signal by mixing the output signal of the LNA 41 with the output signal of the local oscillator 43. While this baseband signal may be an empty-data signal, it is preferably a signal including an appropriate image or voice diagnosis data.

The baseband signal outputted from the mixer 42 is inputted into the ADC 45 of the baseband section 4c via the LPF 44. The ADC 45 A/D-converts the baseband signal into a digital signal.

Subsequently, the digital signal outputted from the ADC 45 is inputted into the digital processing unit 46. The digital processing unit 46 subjects the digital signal to the above-mentioned known OFDM demodulation, FEC decoding, TPS (TMCC) demodulation, or the like. Thus, the above-mentioned diagnosis data is decoded and reproduced.

At that time, in the DTV receiver 4, the output signal of the LNA 41 is used to verify the operation check of the RF tuner section 4b and baseband section 4c.

Simply put, whether the operation of each of the LNA 41, mixer 42, local oscillator 43, and LPF 44 of the RF tuner section 4b and the ADC 45 of the baseband section 4c is good or bad is determined and checked on the basis of whether an output appears in the ADC 45.

Also, in a case where an OFDM demodulation output of the digital processing unit 46 is monitored, whether the operation of each of the LNA 41, mixer 42, local oscillator 43, and LPF 44 of the RF tuner section 4b and the ADC 46 and digital processing unit 46 of the baseband section 4c is good or bad cane be determined and checked on the basis of whether the OFDM demodulation output appears (whether OFDM demodulation is performed).

Also, by monitoring FEC decoding or TPS (TMCC) demodulation of the digital processing unit 46, the operation of these elements may be checked.

Subsequently, the result of the operation check of these elements is visually notified on the display screen of the mobile communication terminal 1a in the form of a message, a symbol mark, or the like, or auditorily notified in the form of an auditory message or a notice sound.

In a case where the second transmission signal is an RF signal including an image or voice diagnosis data as described above, whether the operation is good or bad is checked and notified on the basis of whether demodulation display of the above-mentioned diagnosis data image or voice output occurs on the mobile communication terminal 1a when performing self-diagnosis, for example, even if monitoring of a demodulation output of the ADC 45 or digital processing unit 46, or the like is not performed.

According to the above-described embodiment, it is possible to perform self-diagnosis for verifying the reception function of the DTV receiver 4 using the GSM transmission/reception circuit 2 and WLAN communication unit 3 included in the mobile communication terminal 1a without having to prepare a special test instrument for self-diagnosis, such as an OFDM signal oscillator, or the like and without having to embed a special additional circuit component for performing self-diagnosis of the DTV receiver 4, such as a local oscillation circuit, in the mobile communication terminal 1a.

Also, since transmission radio waves of the GSM transmission/reception circuit 2 and WLAN communication unit 3 included in the mobile communication terminal 1a are used, there is no need to install wiring or the like for self-diagnosis between the GSM transmission/reception circuit 2 and WLAN communication unit 3 and the DTV receiver 4 nor need to modify the circuit configuration, wiring, or the like of the mobile communication terminal 1a.

In this case, it is possible to perform self-diagnosis for verifying the reception function of the DTV receiver 4 without any restrictions in any region or place. Therefore, it is possible not only to perform an inspection inexpensively and easily during assembly or shipment of the mobile communication terminal 1a without increasing the manufacturing cost or upsizing of the mobile communication terminal 1a but also for the user of the mobile communication terminal 1a to perform self-diagnosis of the DTV receiver 4 included in the mobile communication terminal 1a in any place by easily operating a key on the mobile communication terminal 1a. Thus, user convenience is enhanced.

Figure 4:
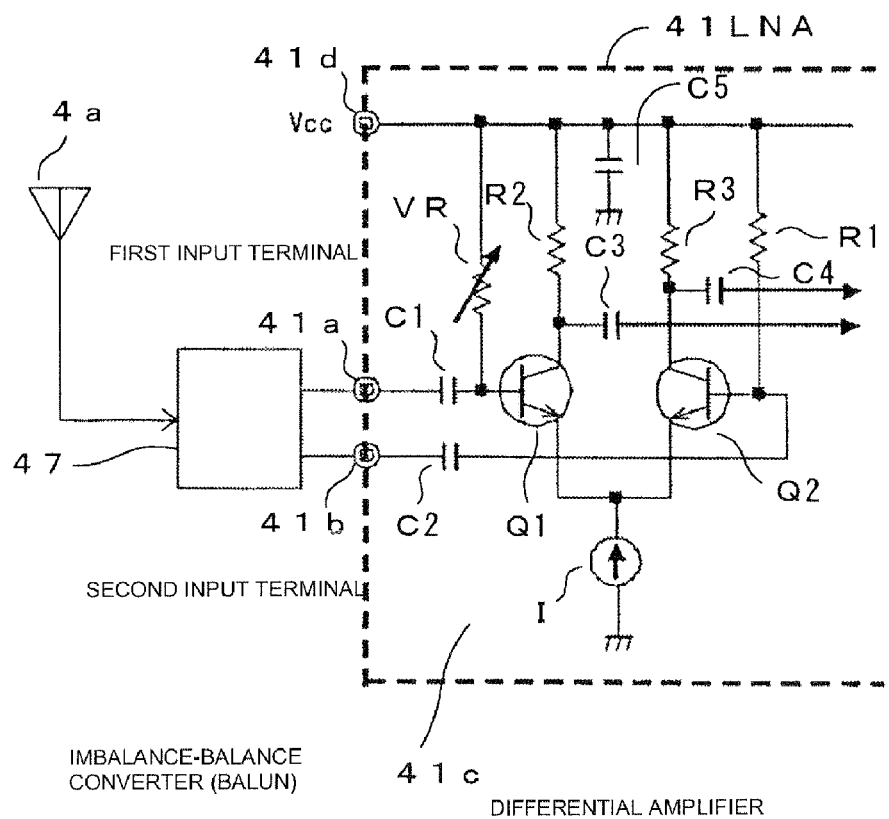
FIG. 4 is a connection diagram of a low miscellaneous surface amplifier (LNA) according to a second embodiment of the present invention.

A second embodiment will be described with reference to FIGS. 2 and 4. FIG. 4 is a connection diagram of one example of the LNA 41.

In this embodiment, as shown in FIG. 4, the LNA 41 of the DTV receiver 4 of the mobile communication terminal 1a having the configuration shown in FIG. 2 is formed using a differential amplifier 41c that has a first input terminal 41a and a second input terminal 41b and inherently has little non-linear characteristic.

Also, an imbalance-balance converter (balun) 47 for imbalance-balance-converting an RF signal received and inputted by the antenna 4a is provided in the preceding stage of the LNA 41. When self-diagnosis is performed, the received first transmission signal is inputted into the first input terminal (e.g., balance input terminal) 41a, and the received second transmission signal is inputted into the second input terminal (e.g., balance input terminal) 41b.

The differential amplifier 41c has a configuration where an input signal inputted from the first input terminal 41a is applied to the base, in the case of bipolar, or gate, in the case of FET, of a first transistor Q1 and an input signal inputted from the second input terminal 41b is applied to the base or gate of a second transistor Q2. An emitter circuit or source circuit for both the first transistor Q1 and second transistor Q2 is formed in a common constant-current circuit I.

For example, the bias resistance of the base or gate of the first transistor Q1 is formed using a variable resistance VR, and the bias resistance of the base or gate of the second transistor Q2 is formed using a fixed resistance R1.

When performing self-diagnosis of the DTV receiver 4, the variable resistance VR varies automatically from a normal value equal to the fixed resistance R1. Thus, a bias voltage applied to the base or gate of the first transistor Q1 and a bias voltage applied to the base or gate of the second transistor are made different from each other, and the non-linear operation of the LNA 41 is facilitated. For this reason, the first transmission signal and second transmission signal are easily mixed.

In FIG. 4, R2 and R3 are resistances of the collectors or drains of the transistors Q1 and Q2, C1 to C4 are coupling capacitors, and C5 is a capacitor of a noise filter. 41d represents a terminal of a direct-current bias power supply vcc. Outputs of the collectors or drains of the transistors Q1 and Q2 are inputted into the mixer 42 shown in FIG. 2.

Thus, even in cases such as a case where the LNA 41 is formed, for example, using the differential amplifier 41c that inherently has little non-linear characteristic and has good characteristics, when performing self-diagnosis, the non-linear operation of the LNA 41 is facilitated by making different a bias voltage applied to the base or gate of the first transistor Q1 and a bias voltage applied to the base or gate of the second transistor Q2, the first transmission signal and second transmission signal are mixed so that second-order inter-modulation distortion (IMD) is facilitated, and a UHF band signal having signal strength required for self-diagnosis can be obtained with a small mobile phone output and a small WLAN output. By using this signal, an advantage similar to that of the first embodiment can be obtained.

Also, by exchanging the variable resistance VR with the fixed resistance R1 so as to cause the variable resistance VR to automatically vary from a normal value equal to the fixed resistance R1, a bias voltage applied to the base or gate of the first transistor Q1 and a bias voltage applied to the base or gate of the second transistor Q2 may be made different from each other.

While the transistors Q1 and Q2 are shown using NPN-type bipolar transistors in FIG. 4, the transistors Q1 and Q2 may be n-channel FETs. Also, the transistors Q1 and Q2 may be formed using PNP-type bipolar transistors or p-channel FETs by inverting the polarity of the bias power supply.

Even if the imbalance-balance converter 47 is omitted and any one of the input terminals 41a and 41b is grounded via a resistance equivalent to the input impedance, the LNA 41 is activated in the same manner and the same advantage is obtained.

Figure 5:
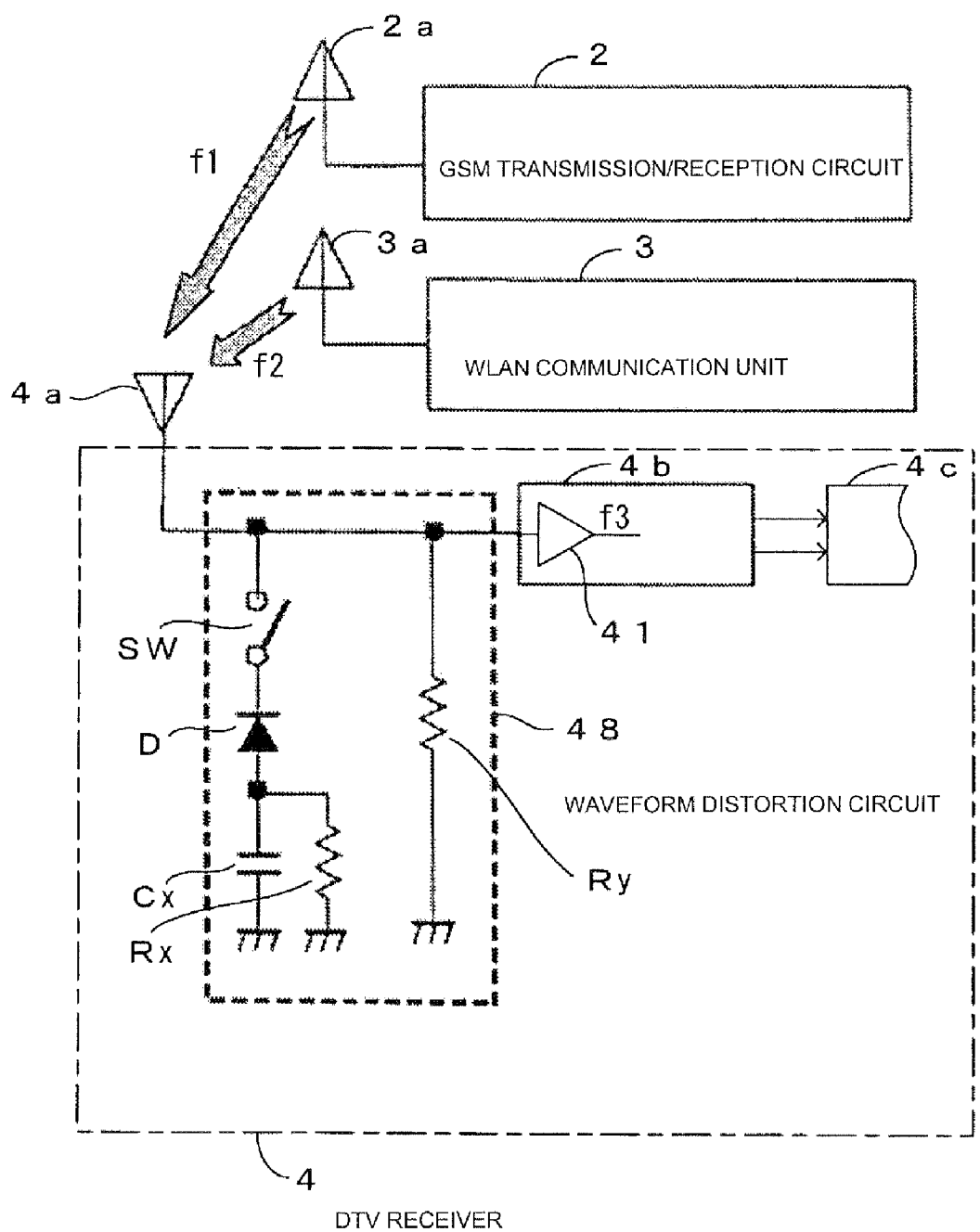
FIG. 5 is a connection diagram of a waveform distortion circuit according to a third embodiment of the present invention.

A third embodiment will be described with reference to FIGS. 2 and 5. FIG. 5 is connection diagram of one example of a waveform distortion circuit 48 provided in the preceding stage of the low-noise amplifier 41.

In this embodiment, the waveform distortion circuit 48 is provided at a midpoint of connection between the antenna 4a and RF tuner section 4b of the DTV receiver 4, that is, in the preceding stage of the LNA 41 in the mobile communication terminal 1a having the configuration shown in FIG. 2.

In the waveform distortion circuit 48, the cathode of a diode D for preventing a backward current is connected to the input line of the LNA 41 via a switch SW. The switch SW may be any of a mechanical switch and a semiconductor switch.

The anode of the diode D is grounded via a parallel circuit consisting of a resistance RX forming a filter and a capacitor CX. The resistance value of the resistance RX is set to the magnitude fixed to the operation point where the non-linear characteristic of the diode D is maximized Also, the above-mentioned input line is grounded via a resistance Ry for input impedance.

If the characteristics of the RF tuner section 4b do not deteriorate due to second-order inter-modulation distortion (IMD) (specifically, if there is no interference source near the mobile communication terminal 1a), the switch SW may be a normally closed (normally-on) switch. If not so, the switch SW is formed using a normally open (normally-off) switch that is closed only when performing self-diagnosis, and is closed at least when performing self-diagnosis.

At this time, the waveform distortion circuit 48 is activated on the basis of the self-bias method that uses, as a bias power supply, a direct-current voltage obtained by rectifying an RF signal at the input of the LNA 41 using the diode D, and distorts the first and second transmission signals received and inputted by the antenna 41, using the non-linearity of the diode D.

Therefore, in cases such as a case where the non-linear characteristic of the LNA 41 is small and thus second-order inter-modulation distortion (IMD) is small, the above-mentioned difference signal for self-diagnosis having a sufficient level is outputted from the LNA 41 by distorting both the transmission signals using the waveform distortion circuit 48 in the preceding stage of the LNA 41 rather than configuring the LNA 41 as shown in FIG. 4. Thus, an advantage similar to that of the above-mentioned first embodiment can be obtained.

Figure 6:
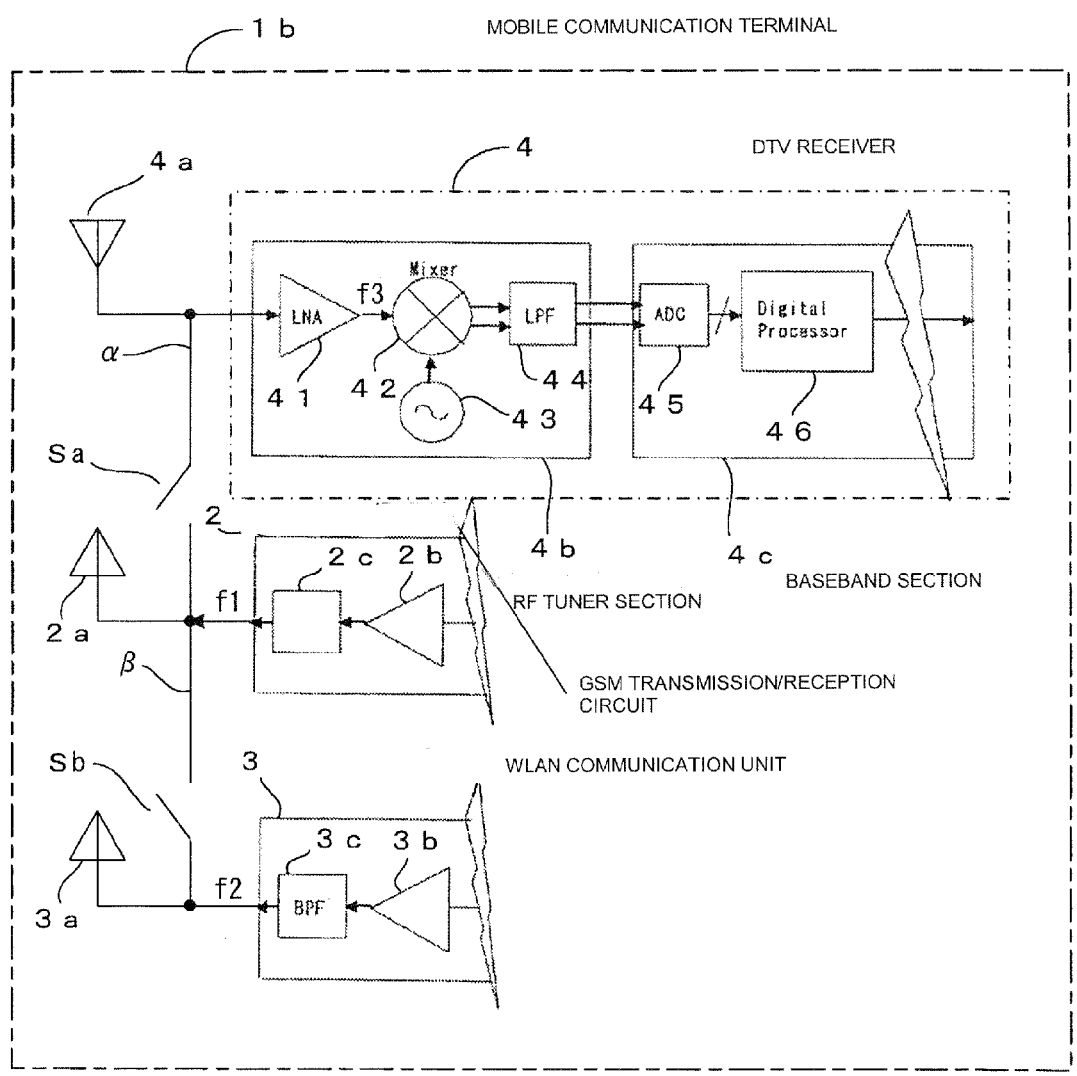
FIG. 6 is a block connection diagram of a mobile communication terminal to a fourth embodiment of the present invention.
Figure 7:
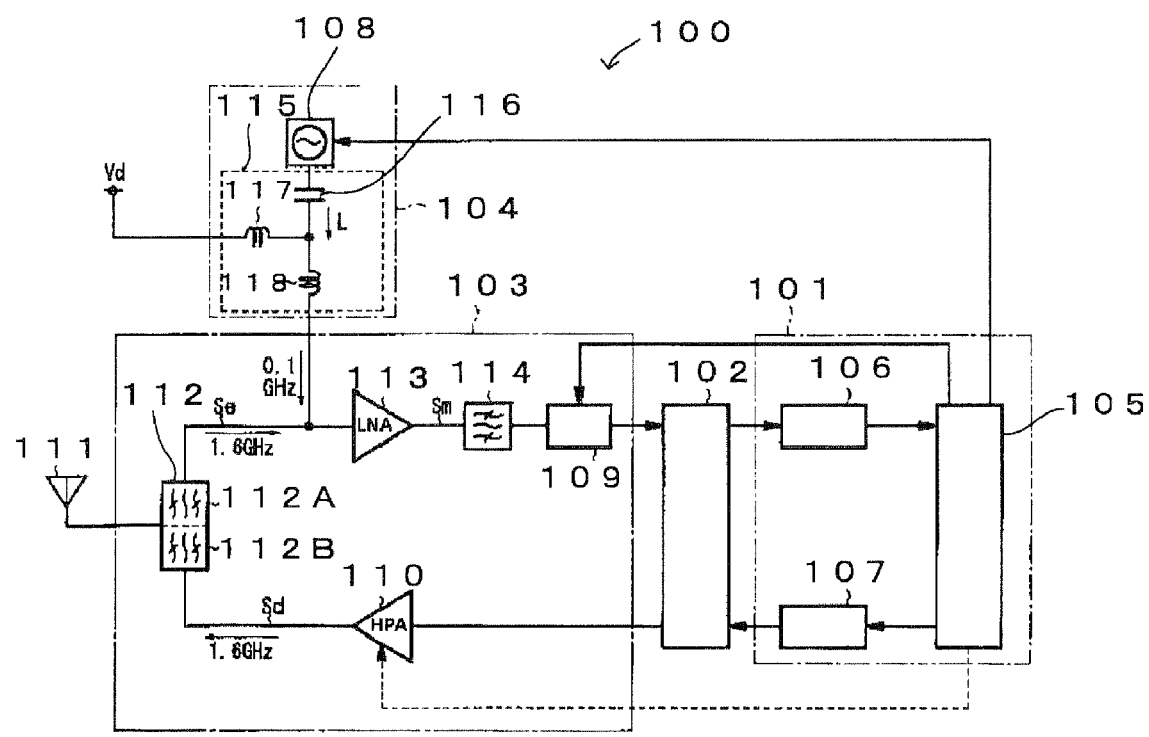
FIG. 7 is a connection diagram of an apparatus according to a related-art example.
Figure 8:
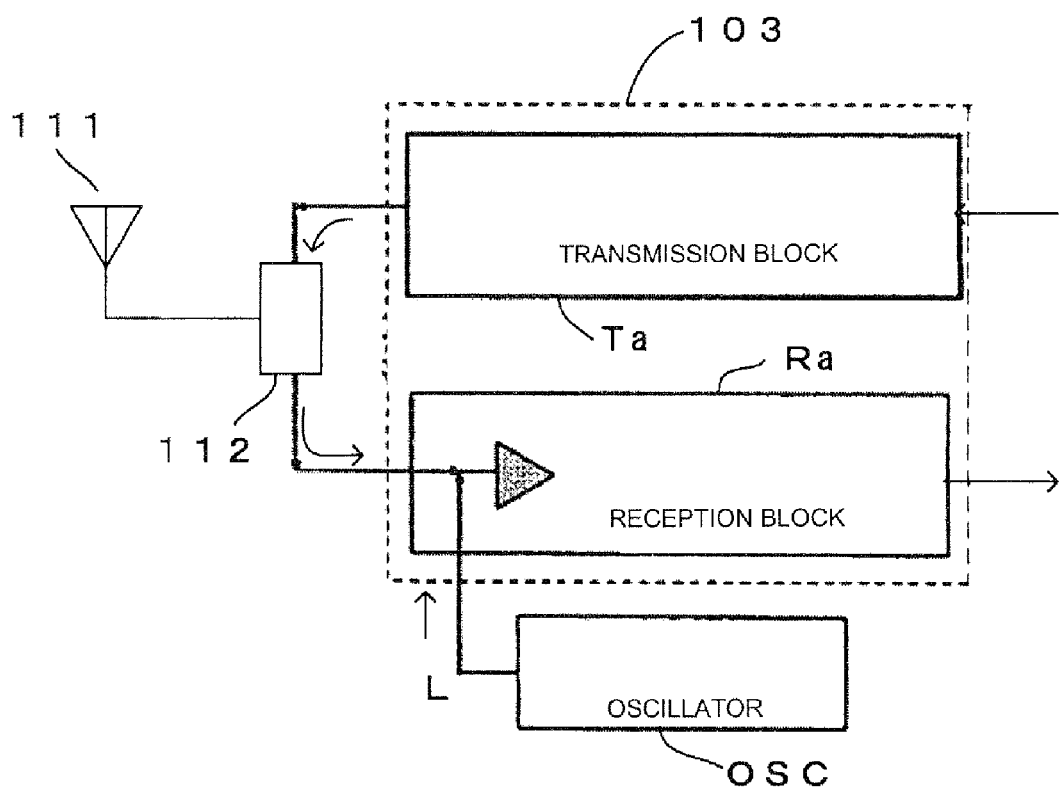
FIG. 8 is a block diagram of the apparatus shown in FIG. 7.

A fourth embodiment will be described with reference to FIG. 6. FIG. 6 is a block connection diagram of a mobile communication terminal 1b corresponding to the mobile communication terminal 1a according to the first embodiment. In FIG. 6, same reference numerals as those shown in FIG. 2 represent same or equivalent elements.

The configuration of this embodiment is different from that of the first embodiment in that a normally open switch Sa is inserted into a wiring line α connecting an antenna terminal of the DTV receiver 4 and that of the GSM transmission/reception circuit 2, a normally open switch Sa is inserted into a wiring line β connecting the antenna terminal of the DTV receiver 4 and that of the WLAN communication unit 3, and thus the DTV receiver 4 and GSM transmission/reception circuit 2 are connected via the switch Sa by wire and the DTV receiver 4 and WLAN communication unit 3 are connected via the switch Sb by wire. The switches Sa and Sb may each be any of a mechanical switch and a semiconductor switch. For example, the switches Sa and Sb may be provided as integrated into the RF tuner section 4b.

When performing self-diagnosis of the DTV receiver 4, the switches Sa and Sb are both closed (turned on) in an interlocked manner, and the wiring lines α and β constitute a so-called "wired OR" wired transmission path for the first transmission signal having the frequency f1, of the GSM transmission/reception circuit 2 and the second transmission signal having the frequency f2, of the WLAN communication unit 3.

At this time, the first transmission signal is inputted as a wire signal into the LNA 41 of the RF tuner section 4b of the DTV receiver 4 via the switch Sa. Simultaneously, the second transmission signal is inputted as a wire signal into the LNA 41 of the RF tuner section 4b of the DTV receiver 4 via the switches Sb and Sa.

Subsequently, by mixing the transmission signals using the non-linear characteristic of the LNA 41 so that second-order inter-modulation distortion (IMD) occurs, a UHF-band difference signal having the frequency f3, which is the difference between both the transmission signals, is generated. Using this difference signal, self-diagnosis of the DTV receiver 4 is performed as in the first embodiment.

This embodiment configured so that the first and second transmission signals are transmitted to the DTV receiver 4 by wire in accordance with opening or closing of the switches Sa and Sb has an advantage similar to that of the first embodiment.

Also, since the switches Sb and Sb are maintained as opened except when performing self-diagnosis of the DTV receiver 4, there is no case where the wired transmission path for both the transmission signals is cut off and thus accidental intrusion of both the transmission signals into the LNA 41, or the like occurs, nor a case where the reception performance of the DTV receiver 4 deteriorates due to the addition of the self-diagnosis function.

Also in the mobile communication terminal 1b according to this embodiment, the LNA 41 may be formed using the differential amplifier 41c shown in FIG. 4 and the imbalance-balance converter 47 or the like may be provided in the preceding stage of the differential amplifier 41c as in the second embodiment so that the advantage of the second embodiment is obtained. Also, the waveform distortion circuit 48 shown in FIG. 5 may be provided in the preceding stage of the LNA 41 as in the third embodiment so that the advantage of the third embodiment is obtained.

The present invention is not limited to the above-mentioned embodiments and various changes can be made to the above-mentioned ones without departing the spirit and scope of the invention. For example, the communication unit having a network communication function according to each embodiment may be wired LAN communication units.

Also, in a case where a communication unit having a wired or wireless PAN function using a frequency band in the ISM band is included in the mobile communication terminal 1a or mobile communication terminal 1b instead of the communication unit having a LAN function or together with the communication unit having a LAN function, a configuration where the WLAN communication unit 3 according to each embodiment is replaced with the communication unit having a PAN function may be adopted. In this case, it is preferable to use a Bluetooth communication unit as the communication unit having a PAN function. Even if a Bluetooth communication unit is used, the advantages of the embodiments are obtained by configuring the Bluetooth communication unit as in the embodiments.

Also, if any one or both of a communication unit having a LAN function and a communication unit having a PAN function are included in a multiple number in the mobile communication terminal 1a or mobile communication terminal 1b, any one of these communication units is preferably used instead of the WLAN communication unit 3 according to each embodiment.

Also, the transmission/reception circuit having mobile phone functions according to the present invention is not limited to the GSM transmission/reception circuit 2 and may be, for example, a CDMA transmission/reception circuit. In this case, it is preferable that when performing self-diagnosis, a signal including only carrier waves (single tone) be outputted as the first transmission signal without causing second-order modulation for frequency spreading nor first-order modulation so as to form the above-mentioned UHF-band difference signal.

Also, the transmission/reception circuit having cell pone functions according to the present invention may be a transmission/reception circuit using W-CDMA, PHS, or the like. Even in this case, it is possible to form the first transmission signal so as to form the above-mentioned UHF-band difference signal.

Also, the RF tuner section 4b of the DTV receiver 4 may be configured to perform IF conversion (superheterodyne type) rather than direct conversion (zero-IF type).

The present invention is applicable to various mobile communication terminals having at least mobile phone functions, a network communication function, and a DTV reception function.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A mobile communication terminal comprising:
   a transmission/reception circuit having a mobile phone function;
   a communication unit having a function of communicating with a network formed by at least one local area network communication unit and/or at least one personal area network communication unit, the at least one local area network communication unit and/or the at least one personal area network communication unit using a frequency band in an industry-science-medical (ISM) band; and
   a digital terrestrial television broadcasting receiver to receive digital terrestrial television broadcasting targeted to mobile communication terminals, wherein
   the digital terrestrial television broadcasting receiver includes:
      a low-noise amplifier to amplify a received and inputted RF signal;
      a local oscillator to generate a signal having a frequency corresponding to an output signal of the low-noise amplifier;
      a mixer to mix the output signal of the low-noise amplifier with the output signal of the local oscillator;
      an A/D converter to convert a baseband signal contained in the RF signal into a digital signal, the baseband signal being obtained due to the mixture; and a demodulation circuit to modulate the digital signal obtained by the A/D converter, and the mobile communication terminal having a self-diagnosis mode configured to receive a first transmission signal outputted by the transmission/reception circuit having a mobile phone function and a second transmission signal outputted by the communication unit having a function of communicating with a network, using the digital terrestrial television broadcasting receiver; to generate a difference signal having a frequency that is a difference between both the transmission signals by mixing both the transmission signals using a non-linear characteristic of the low-noise amplifier; and to self-diagnose whether the digital terrestrial television broadcasting receiver is normally operating, on the basis of an output of the A/D converter based on an output signal of the mixer obtained by mixing the difference signal with the output signal of the local oscillator.

2. The mobile communication terminal according to claim 1, wherein the digital terrestrial television broadcasting receiver receives a radio wave obtained by combining the first transmission signal and the second transmission signal in space, using an antenna for receiving digital terrestrial television broadcasting and inputs the radio wave into the low-noise amplifier.

3. The mobile communication terminal according to claim 2, wherein the self-diagnosis mode self-diagnoses whether the digital terrestrial television broadcasting receiver is normally operating, on the basis of an output of the demodulation circuit instead of the output of the A/D converter.

4. The mobile communication terminal according to claim 3, wherein the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

5. The mobile communication terminal according to claim 1, wherein the digital terrestrial television broadcasting receiver and the transmission/reception circuit having a mobile phone function are connected to each other via a normally open switch by wire, and the digital terrestrial television broadcasting receiver and the communication unit having a function of communicating with a network are connected to each other via a normally open switch by wire, and only when performing self-diagnosis, both the switches are closed so that the first transmission signal and the second transmission signal are inputted into the low-noise amplifier.

6. The mobile communication terminal according to claim 5, wherein the self-diagnosis mode self-diagnoses whether the digital terrestrial television broadcasting receiver is normally operating, on the basis of an output of the demodulation circuit instead of the output of the A/D converter.

7. The mobile communication terminal according to claim 6, wherein the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

8. The mobile communication terminal according to claim 1, wherein the self-diagnosis function self-diagnoses whether the digital terrestrial television broadcasting receiver is normally operating, on the basis of an output of the demodulation circuit instead of the output of the A/D converter.

9. The mobile communication terminal according to claim 8, wherein the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

10. The mobile communication terminal according to claim 1, wherein the local area network communication unit is a wireless LAN communication unit.

11. The mobile communication terminal according to claim 10, wherein the personal area network communication unit is a Bluetooth communication unit.

12. The mobile communication terminal according to claim 11, wherein the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

13. The mobile communication terminal according to claim 12, wherein a waveform distortion circuit that is activated only at the time of self-diagnosis so as to distort waveforms of the first and second transmission signals is additionally provided in the preceding stage of the low-noise amplifier so that the first and second transmission signals are mixed.

14. The mobile communication terminal according to claim 1, wherein
the personal area network communication unit is a Bluetooth communication unit.

15. The mobile communication terminal according to claim 14, wherein
the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and
by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

16. The mobile communication terminal according to claim 15, wherein
a waveform distortion circuit that is activated only at the time of self-diagnosis so as to distort waveforms of the first and second transmission signals is additionally provided in the preceding stage of the low-noise amplifier so that the first and second transmission signals are mixed.

17. The mobile communication terminal according to claim 1, wherein
the low-noise amplifier is formed using a differential amplifier having first and second input terminals and has a configuration where an input signal inputted from the first input terminal is applied to a base or gate of a first transistor and an input signal inputted from the second input terminal is applied to a base or gate of a second transistor, and
by making a bias voltage applied to the base or gate of the first transistor and a bias voltage applied to the base or gate of the second transistor different from each other, non-linear operation of the low-noise amplifier is facilitated so that the first transmission signal and the second transmission signal are mixed.

18. The mobile communication terminal according to claim 17, wherein
a waveform distortion circuit that is activated only at the time of self-diagnosis so as to distort waveforms of the first and second transmission signals is additionally provided in the preceding stage of the low-noise amplifier so that the first and second transmission signals are mixed.

19. The mobile communication terminal according to claim 17, wherein
a waveform distortion circuit that is activated only at the time of self-diagnosis so as to distort waveforms of the first and second transmission signals is additionally provided in the preceding stage of the low-noise amplifier so that the first and second transmission signals are mixed.

20. The mobile communication terminal according to claim 1, wherein
a waveform distortion circuit that is activated only at the time of self-diagnosis so as to distort waveforms of the first and second transmission signals is additionally provided in the preceding stage of the low-noise amplifier so that the first and second transmission signals are mixed.

* * * * *